C. BLOM, Jr.

IRONING-TABLE.

No. 7,058. Reissued April 18, 1876.

Witnesses:

P. C. Dieterich

Wm. R. Wakeman.

Inventor:

Cornelius Blom Jr.

Per: C. H. Watson & Co Attorneys.

N. PETERS, PHOTO-LITHOGRAPHER, WASHINGTON, D. C.

UNITED STATES PATENT OFFICE.

CORNELIUS BLOM, JR., OF GRAND HAVEN, MICHIGAN, ASSIGNOR, BY MESNE ASSIGNMENTS, TO JACOB BRINKERHOFF.

IMPROVEMENT IN IRONING-TABLES.

Specification forming part of Letters Patent No. 145,614, dated December 16, 1873; reissue No. 7,058, dated April 18, 1876; application filed March 23, 1876.

*To all whom it may concern:*

Be it known that I, CORNELIUS BLOM, Jr., of Grand Haven, in the county of Ottawa and State of Michigan, have invented certain new and useful Improvements in Ironing-Tables; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
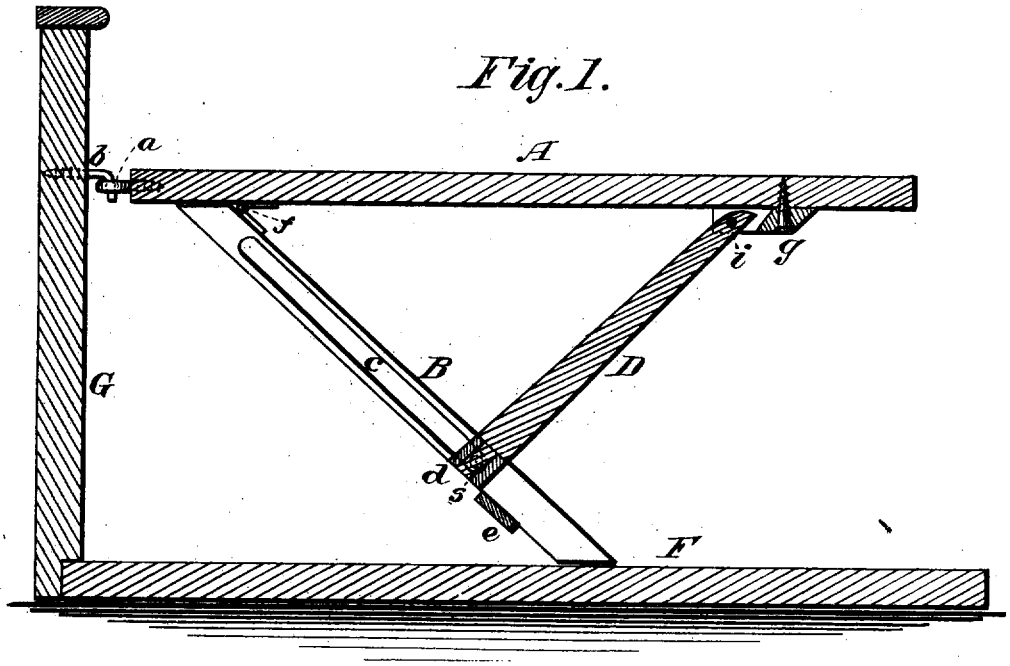
Figure 2:
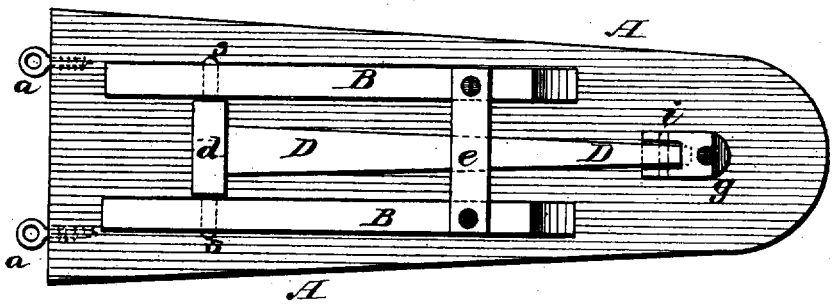

Figure 1 of the drawings is a representation of a sectional view of my ironing-board. Fig. 2 is a plan view of the same.

This invention has relation to supports for ironing-boards; and it consists in a folding supporting-brace and an ironing-board, which is adapted for attachment to a wall by means of hooks and eyes, as will be hereinafter explained.

The following is a description of my improvement:

In the annexed drawings, A represents an ironing-board, of any suitable shape or size, which has two eyes, *a a*, fixed into its largest end, for engaging with hooks *b* on the wall G. B B represent two parallel supporting-legs, connected together by a cross-bar, *e*, near their lower beveled ends, and connected to the bottom of the board A by means of hinges *f*. D represents a prop or brace, which is pivoted to a block, *g*, at *i*, and connected to a sliding cross-bar, *d*, at its opposite end. The cross-bar *d* has rounded extremities *s s*, which are received into slots *c* formed in the legs B. The slots *c* are of such length as will allow the legs and prop to be folded up close to the board A, as shown in Fig. 2, when it is desired to set the board out of the way.

To erect the board, the eyes *a a* are caught into the hooks *b b*, and the legs B are brought down upon the floor F in the inclined position indicated in Fig. 1. The cross-head *d* on prop D is then moved down to the lower ends of the slots *c*, so that this prop, with the legs B and board A, form a triangle, which will firmly support the board in a horizontal position.

It will be observed that the legs B B prevent the board from being tilted laterally, while the downwardly-directed hooks *b b* prevent the board from being tilted longitudinally.

What I claim as new, and desire to secure by Letters Patent, is—

1. The hinged slotted legs B, in combination with the pivoted prop D, connection *d*, and the part A, for the purpose set forth.

2. The ironing-board A, having the hinged oblique-slotted legs B, the pivoted prop D, having the horizontal cross-bar *d*, with rounded ends, sliding in the slots *c* of said legs, said slots being of proper length to allow the legs and prop to be folded closely up against the board, and, when down, to take a bracing position nearly rectangular with each other, substantially as specified.

In testimony that I claim the foregoing I have hereunto set my hand this 20th day of March, 1876.

CORNELIUS BLOM, JR.

Witnesses:
FELIX J. ORT,
JOHN JACOBUSE.